United States Patent [19]

Yan

[11] 4,411,873

[45] Oct. 25, 1983

[54] IN-LINE REGENERATION OF POLYTHIONATE POISONED ION EXCHANGE RESINS

[75] Inventor: Tsoung-Yuan Yan, Philadelphia, Pa.

[73] Assignee: Mobil Oil Corporation, New York, N.Y.

[21] Appl. No.: 270,302

[22] Filed: Jun. 4, 1981

Related U.S. Application Data

[63] Continuation of Ser. No. 221,554, Dec. 31, 1980, abandoned.

[51] Int. Cl.$^3$ .............................................. C01G 43/00
[52] U.S. Cl. ....................... 423/7; 210/668; 210/673; 210/682; 299/5; 423/17; 423/20; 423/514
[58] Field of Search ................. 423/7, 17, 18, 20, 514; 210/668, 673, 682; 299/4, 5

[56] References Cited

U.S. PATENT DOCUMENTS

| | | | |
|---|---|---|---|
| 2,315,534 | 4/1943 | Marasco | 423/514 |
| 2,776,258 | 1/1957 | Gilliland | 210/673 |
| 3,458,440 | 7/1969 | Schmidt | 210/673 |
| 3,692,670 | 9/1972 | Burns et al. | 210/673 |
| 4,214,791 | 7/1980 | Moore | 423/20 |
| 4,296,075 | 10/1981 | Yan | 423/7 |
| 4,298,578 | 11/1981 | Yan et al. | 423/7 |
| 4,312,838 | 1/1982 | Yan | 423/7 |

FOREIGN PATENT DOCUMENTS

| | | | |
|---|---|---|---|
| 910025 | 11/1962 | United Kingdom | 423/7 |
| 1115797 | 5/1968 | United Kingdom | 423/7 |

OTHER PUBLICATIONS

Nugent, *The South African Industrial Chemist*, 10, pp. 282-290 (11-1956).

*Primary Examiner*—Edward A. Miller
*Attorney, Agent, or Firm*—Alexander J. McKillop; James F. Powers, Jr.; John K. AboKhair

[57] ABSTRACT

A process is described for minimizing accumulation of undesirable polythionates on an ion exchange resin used to recover uranium values from a leachate from an in situ mining operation by adding sulfite, either as a sulfite salt or as $SO_2$, directly to the leachate or to the eluant.

3 Claims, No Drawings

IN-LINE REGENERATION OF POLYTHIONATE POISONED ION EXCHANGE RESINS

RELATED APPLICATION

This application is a continuation of my application Ser. No. 221,554, filed on Dec. 31, 1980 abandoned.

FIELD OF THE INVENTION

This invention relates generally to the production of uranium and more particularly to the regeneration of ion exchange resins which are employed in the recovery of uranium from a pregnant leachate formed in an in situ leaching operation. More specifically yet, the present invention relates to the regeneration of such resins which have become poisoned with polythionate.

BACKGROUND OF THE INVENTION

The leachate from in situ uranium leaching processes most always contains some polythionates. Polythionate concentration is particularly high where the gangue materials are rich in sulfides, such as pyrites. The polythionate concentration is also higher in the early stage of leaching operation. When the leachate is passed over the ion exchange resin for uranium recovery, the polythionates are also adsorbed on the resin strongly. The polythionate adsorption is so strong that they cannot be eluted along with the uranium in the normal elution cycle and become a poison to decrease the uranium loading capacity of the resin in the following loading cycles.

Use of $H_2O_2$ or strong caustic solution has been suggested for regeneration of polythionate poisoned resins. However, both procedures attack the resin chemically and physically resulting in shortened resin life.

In application Ser. No. 270,303 abandon filed concurrently herewith by Hans-Peter C. Schmiedel and commonly assigned, there is disclosed and claimed a new process for controlling polythionate poisoning of the ion exchange resin. The process involves treating the poisoned resin with a solution of $Na_2SO_3$, preferably 0.1 M, which may also contain another non-reacting salt, e.g. NaCl. The reaction may be represented as follows:

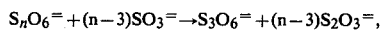

$$S_nO_6^= + (n-3)SO_3^= \rightarrow S_3O_6^= + (n-3)S_2O_3^=,$$

wherein n is typically 4–8, usually 4.

The treated resin is then eluted with acidic or neutral eluant to remove the conversion products, namely, thiosulfate and polythionates with 3 or less sulfur atoms per molecule. The procedure requires interruption of normal operation schedules so that the sulfite treatment can be carried out. It was believed important to avoid contacting sulfite, being a reducing agent, with the uranium complex in order that the uranium at +6 state will not be reduced and precipitated.

The improved process of the Schmiedel application offers a number of important advantages, however, including avoidance of undesirable physical and chemical degradation of the resin as had been associated with previous attempts to reduce polythionate poisoning. The entire disclosure of that application is incorporated herein by reference.

DESCRIPTION OF THE INVENTION

The present invention is an improvement on the above-discussed process of Schmiedel and is based on the discovery that polythionate accumulation can be prevented by adding sulfite ion directly to the eluant or, alternatively, directly to the leachate without reducing the uranium from its soluble hexavalent to its insoluble tetravalent state. This finding is totally unexpected in view of the known reducing properties of sulfite ion. Thus, surprisingly, I have discovered that:

(1) Sulfite does not reduce and precipitate the uranium complexes both on the resin and in the leachate solution, and (2) Sulfite is a good eluting agent, perhaps as good as carbonate ion.

This invention therefore provides a process for the regeneration of polythionate poisoned ion exchange resins which does not damage the resins chemically and physically and which can be carried out intermittently or continuously in-line without disrupting the operation schedules and adding new operational steps. Moreover, the process permits regenerating resin without producing hazardous wastes requiring disposal.

The present invention is based on this discovery and includes processes for regenerating polythionate poisoned resin in situ, continuously or intermittently, by adding $SO_2$ or sulfites to the eluant or to the leachate. Preferably essentially stoichiometric amounts are added. The sulfite can be added as a sulfite salt (e.g. $Na_2SO_3$, etc.) or as $SO_2$ gas. It can be added uniformly in the eluant, or it can be injected as a slug at the beginning of the elution cycle. If acid elution (HCl/NaCl solution) is used, it is preferred to add $SO_3^=$ as a slug at the start of the elution cycle. If an excess amount of $SO_3^=$ is added, $SO_3^=$ will be present in the eluate and consume extra $H_2O_2$ in the subsequent precipitation step. The $SO_3^=$ injection can be carried out as frequently as it is required to keep the resin essentially free of polythionate poisoning.

Similarly, a stoichiometric amount of $SO_3^=$ may be added to the leachate (feed to the ion exchanger) continuously or intermittently as slugs. Injection in the form of a slug is preferred. The slug size can range from 1/100 to 10 bed volumes. The $SO_3^=$ can be in the form of a sulfite salt or as $SO_2$. Addition of $SO_2$ lowers the pH of the leachate, which also improves uranium loading capacity of the resin. Excess amount of $SO_3^=$ injection should be avoided because it can be present in the barren leachate and recycled to the formation or retained in the resin and eluted in the elution cycle. Extra $O_2$ consumption in the leaching will result for the former case, and extra $H_2O_2$ consumption in precipitation will result for the latter case.

The invention offers important industrial advantages by providing an overall more effective uranium recovery process. That is, uranium leakage and loss are minimized, resin loading capacity is increased, ultimate life of the resin is prolonged, and a lower operation cost is achieved.

The foregong description of my invention has been directed to particular details in accordance with the requirements of the Patent Act and for purposes of explanation and illustration. It will be apparent, however, to those skilled in this art that many modifications and changes may be made without departing from the scope and spirit of the invention. It is further apparent that persons of ordinary skill in this art will, on the basis of this disclosure, be able to practice the invention within a broad range of process conditions. It is my intention in the following claims to cover all such equivalent modifications and variations as fall within the true scope and spirit of my invention.

I claim:

1. In a process for recovering uranium values from a uranium-containing ore which also contains sulfides comprising leaching said ore to form uranyl complexes and by-product polythionates, passing the leachate over an anion exchange resin, and eluting uranium from said resin, the improvement comprising adding sulfite directly to said leachate or eluant before being passed over said resin.

2. A process as defined in claim 1, wherein an approximately stoichiometric amount of sulfite is added.

3. A process as defined in claim 1 or 2, wherein said sulfite is added as a sulfite salt or as $SO_2$.

* * * * *